United States Patent [19]

Neutzler

[11] Patent Number: 5,776,624
[45] Date of Patent: Jul. 7, 1998

[54] BRAZED BIPOLAR PLATES FOR PEM FUEL CELLS

[75] Inventor: Jay Kevin Neutzler, Rochester, N.Y.

[73] Assignee: General Motors Corporation, Detroit, Mich.

[21] Appl. No.: 773,239

[22] Filed: Dec. 23, 1996

[51] Int. Cl.[6] .............................. H01M 8/04; H01M 8/10
[52] U.S. Cl. .............................. 429/26; 429/33; 429/34; 429/210
[58] Field of Search ................ 429/210, 26, 34, 429/33

[56] References Cited

U.S. PATENT DOCUMENTS

| | | | |
|---|---|---|---|
| 4,678,724 | 7/1987 | McElroy | 429/34 |
| 4,977,041 | 12/1990 | Shiozawa et al. | 429/34 X |
| 5,252,410 | 10/1993 | Wilkinson et al. | 429/33 |
| 5,470,679 | 11/1995 | Luns et al. | 429/210 |
| 5,496,655 | 3/1996 | Lessing | 429/34 |

*Primary Examiner*—John S. Maples
*Attorney, Agent, or Firm*—Lawrence B. Plant

[57] ABSTRACT

A liquid-cooled, bipolar plate separating adjacent cells of a PEM fuel cell comprising corrosion-resistant metal sheets brazed together so as to provide a passage between the sheets through which a dielectric coolant flows. The brazement comprises a metal which is substantially insoluble in the coolant.

12 Claims, 3 Drawing Sheets

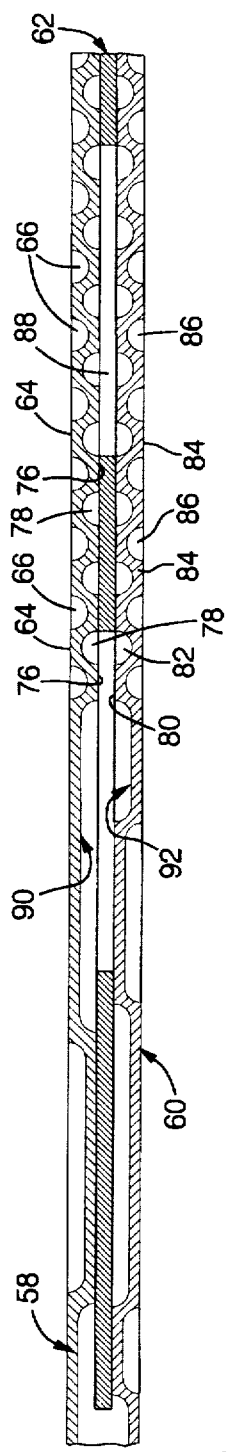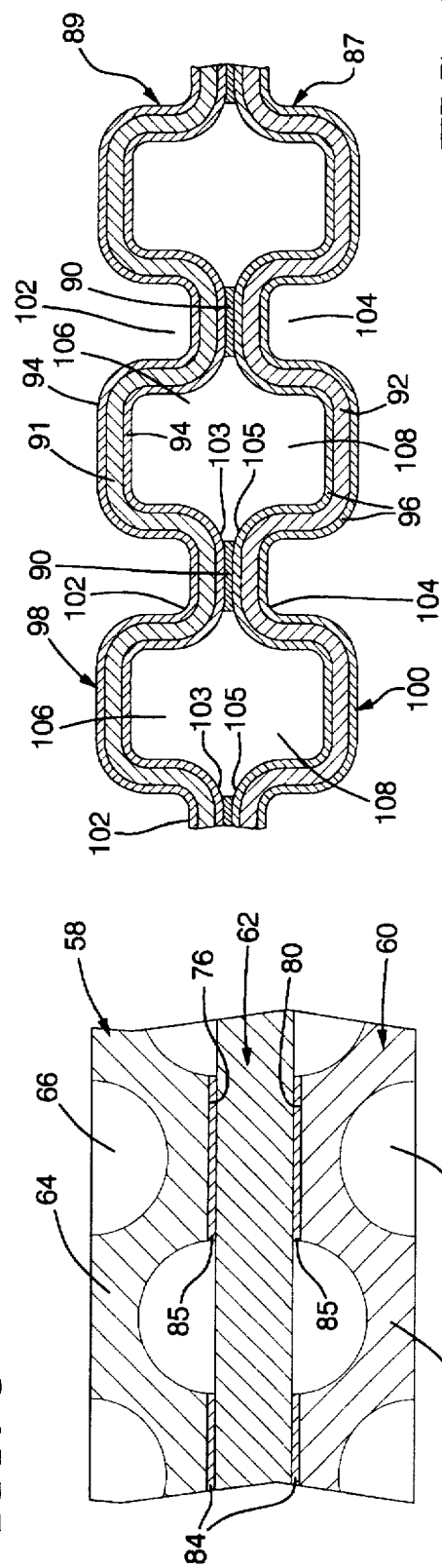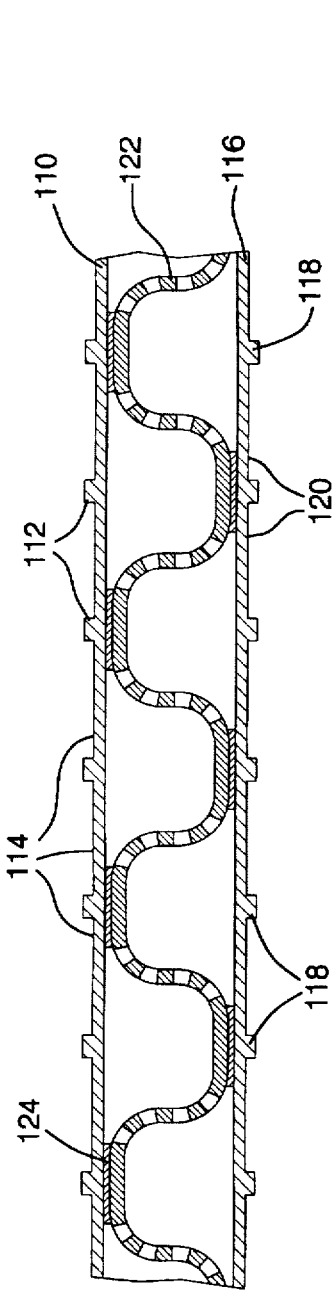

BRAZED BIPOLAR PLATES FOR PEM FUEL CELLS

The Government of the United States of America has rights in this invention pursuant to Contract Number DE-AC02-90CH10435 awarded by the United States Department of Energy.

TECHNICAL FIELD

This invention relates to PEM fuel cell stacks, and more particularly to bipolar plates for separating one cell from the next in such stacks.

BACKGROUND OF THE INVENTION

Fuel cells have been proposed as a power source for electric vehicles, and other devices. One such fuel cell is the PEM (i.e., proton exchange membrane) fuel cell as it has potentially high energy, as well as low weight and volume. PEM fuel cells are well known in the art and include in each cell thereof a so-called "membrane-electrode-assembly" comprising a thin, proton-conductive, polymer, membrane-electrolyte having an anode electrode film formed on one face thereof and a cathode electrode film formed on the opposite face thereof. Such membrane-electrolytes are well known in the art and are described in such U.S. Pat. No. as 5,272,017 and 3,134,697, as well as in the Journal of Power Sources, Volume 29 (1990) pages 367–387, inter alia. In general, such membrane-electrolytes are made from ion exchange resins, and typically comprise a perflourinated sulfonic acid polymer such as NAFION™ available from the E.I. DuPont de Nemours & Co. The anode and cathode films, on the other hand, typically comprise (1) finely divided carbon particles, very finely divided catalytic particles supported on the internal and external surfaces of the carbon particles, and proton-conductive material (e.g., NAFION™) intermingled with the catalytic and carbon particles, or (2) catalytic particles dispersed throughout a polytetrafluroethylene (PTFE) binder. One such membrane-electrode-assembly and fuel cell is described in U.S. Pat. No. 5,272,017 issued Dec. 21, 1993 and assigned to the assignee of the present invention.

The membrane-electrode-assembly (hereafter MEA) for each cell is sandwiched between a pair of electrically conductive elements which serve as current collectors for the anode/cathode and contain an array of grooves in the faces thereof for distributing the fuel cell's gaseous reactants (e.g., $H_2$ and $O_2$/air) over the surfaces of the respective anode and cathode. In a fuel cell stack, a plurality of the cells are stacked together in electrical series while being separated one from the next by an impermeable, electrically conductive, bipolar plate referred to as a bipolar plate. The bipolar plate serves as an electrically conductive separator element between two adjacent cells, and (1) has reactant gas distributing grooves on both external faces thereof, (2) conducts electrical current between the anode of one cell and the cathode of the next adjacent cell in the stack, and (3) in most cases, has internal passages therein which are defined by internal heat exchange faces and through which coolant flows to remove heat from the stack.

In an $H_2$-$O_2$/air PEM fuel cell environment, the exterior faces of the bipolar plates, which confront adjacent cells, are in constant contact with highly corrosive, acidic solutions (pH 3.5–4.5) containing $F^-$, $SO^-_4$, $SO_3^-$, $HSO_4^-$, $CO_3^-$ and $HCO_3^-$, etc. Moreover, (1) the cathode face is polarized in the presence of pressurized air, and (2) the anode is exposed to pressurized hydrogen, e.g., from methanol or hydrocarbon reformate. To survive such an environment, at least the exterior faces of the bipolar plates must be highly corrosion resistant. The internal heat exchange faces of the bipolar plates, on the other hand, are exposed only to generally noncorrosive coolants such as water, antifreeze, or mixtures thereof, etc.

Bipolar plates are often fabricated from graphite which is lightweight, corrosion resistant and electrically conductive in the PEM fuel cell environment. However, graphite is quite brittle which makes it difficult to handle mechanically and has a relatively low electrical and thermal conductivity compared with metals. Finally, graphite is quite porous making it virtually impossible to make very thin gas impervious plates which is desirable for low weight, low volume, low-internal-resistance fuel cell stacks.

It has been proposed to manufacture bipolar plates from metals. More specifically, it has been proposed to make bipolar plates from sheets of corrosion-resistant metal, or from sheets of corrosion-susceptible metals which have been provided (e.g., coated or clad) with a corrosion-resistant outer layer. Particularly effective corrosion-resistant metals include Ti, Cr, stainless steel, inter alia, which achieve their corrosion resistance by developing a dense, passive, oxide barrier layer over the surface thereof. The barrier layer not only protects the exterior faces from corrosion, but also serves to prevent dissolution of even small amounts of metal from the interior, heat exchange faces into the coolant. Such dissolution can cause the coolant to become excessively conductive which, in turn, can cause stray currents to flow through the coolant which can cause short circuiting, induce galvanic corrosion and electrolyze the coolant. Unfortunately, such oxide layers are electrically resistive which increases the internal resistance of the fuel cell if present in the electrical path through the stack.

SUMMARY OF THE INVENTION

The present invention contemplates making a bipolar plate for a fuel cell by brazing a pair of corrosion-resistant metal sheets together (i.e., directly to each other, or via an intermediate sheet) with a substantially insoluble brazement at a plurality of oxide-free sites that are to be exposed to a substantially dielectric coolant flowing between the sheets during operation of the fuel cell. As used herein, the term "corrosion-resistant metal" sheet is intended to include (1) sheets made entirely of a single metal (e.g., Ti, Cr, stainless steel, etc.), or (2) sheets made from a first substrate metal coated or clad with a corrosion-resistant outer layer. By "substantially dielectric" coolant is meant a liquid coolant whose bulk resistivity is at least about 200,000 ohm-cm. The brazing material is selected from metals (including alloys) which melt below the melting temperature of the metal sheets, and form a brazement which is substantially insoluble in the coolant. In the context of the present invention, the term "substantially insoluble" is intended to mean a degree of allowable solubility which is too low to contaminate the coolant with enough metal ions as to diminish the substantially dielectric character of the coolant (i.e., will not cause the coolant's bulk resistivity to drop below about 200,000 ohm-cm.).

More specifically, the present invention relates to a liquid-cooled, bipolar plate (1) for separating adjacent cells of a PEM fuel cell stack, (2) for distributing $H_2$ and air/$O_2$ to the cells, (3) for conducting electric current between adjacent cells of the stack and (4) for cooling the stack. The plate comprises a first corrosion-resistant metal sheet having (1) an external anode-confronting face including a plurality of lands defining a plurality of grooves for distributing hydrogen to the first cell, and (2) an internal first heat exchange face inside the plate for contacting a liquid coolant flowing through the plate. The plate further comprises a second, corrosion-resistant metal sheet having (1) an external cathode-confronting face comprising a plurality of lands defining a plurality of grooves for distributing air/oxygen to the second cell, and (2) an internal second heat exchange face inside the plate for contacting the coolant flowing through the plate. The heat exchange faces of the first and second sheet (1) confront each other so as to define therebetween a coolant flow passage adapted to receive a substantially dielectric liquid coolant, and (2) are electrically coupled to each other at a plurality of oxide-free joints via a brazement having a melting temperature less than the melting temperature of the sheets and formed from metals which are substantially insoluble in the coolant. The oxide-free joints reduce electrical resistance within the stack. While the first and second sheets may be metallurgically bonded directly to each other via the brazement, they will preferably each be metallurgically bonded (i.e., via the brazements) to a discrete intermediate, separator metal sheet that partitions the coolant flow passage. The intermediate separator sheet will preferably be perforated so as to permit coolant to move between the smaller coolant flow passages. The separator metal sheet may be corrugated to provide a plurality of coolant channels in the coolant flow passage, or may be a flat sheet joined to first and second outer sheets which each have a plurality of coolant flow channels formed therein, as for example by corrugating the outer sheets. The corrosion-resistant metal sheets will preferably comprise titanium, or alloys thereof, but may also comprise other corrosion-resistant metals such as the noble metals, stainless steel, nickel, and chromium. All mutually contacting sites of the exterior sheets (and interior separator sheet when used) are brazed together with oxide-free joints to insure that the coolant passage is completely sealed against coolant leakage and to provide low resistance electrical conduction between adjacent cells. The brazing material also serves as a conductive filler for filling any gaps between the sheets resulting from irregularities in the sheets.

BRIEF DESCRIPTION OF THE DRAWINGS

The invention will better be understood when considered in the light of the following detailed description of certain specific embodiments thereof which is given hereafter in conjunction with the several figures in which:

FIG. 3 is a sectioned view in the direction 3—3 of FIG. 2;

FIG. 4 is a magnified portion of the bipolar plate of FIG. 3;

FIG. 5 is a view like that of FIG. 4, but of a different embodiment of the present invention; and FIG. 6 is a view like that of FIG. 3, but of still another embodiment of the present invention.

DETAILED DESCRIPTION OF THE INVENTION

Figure 1:
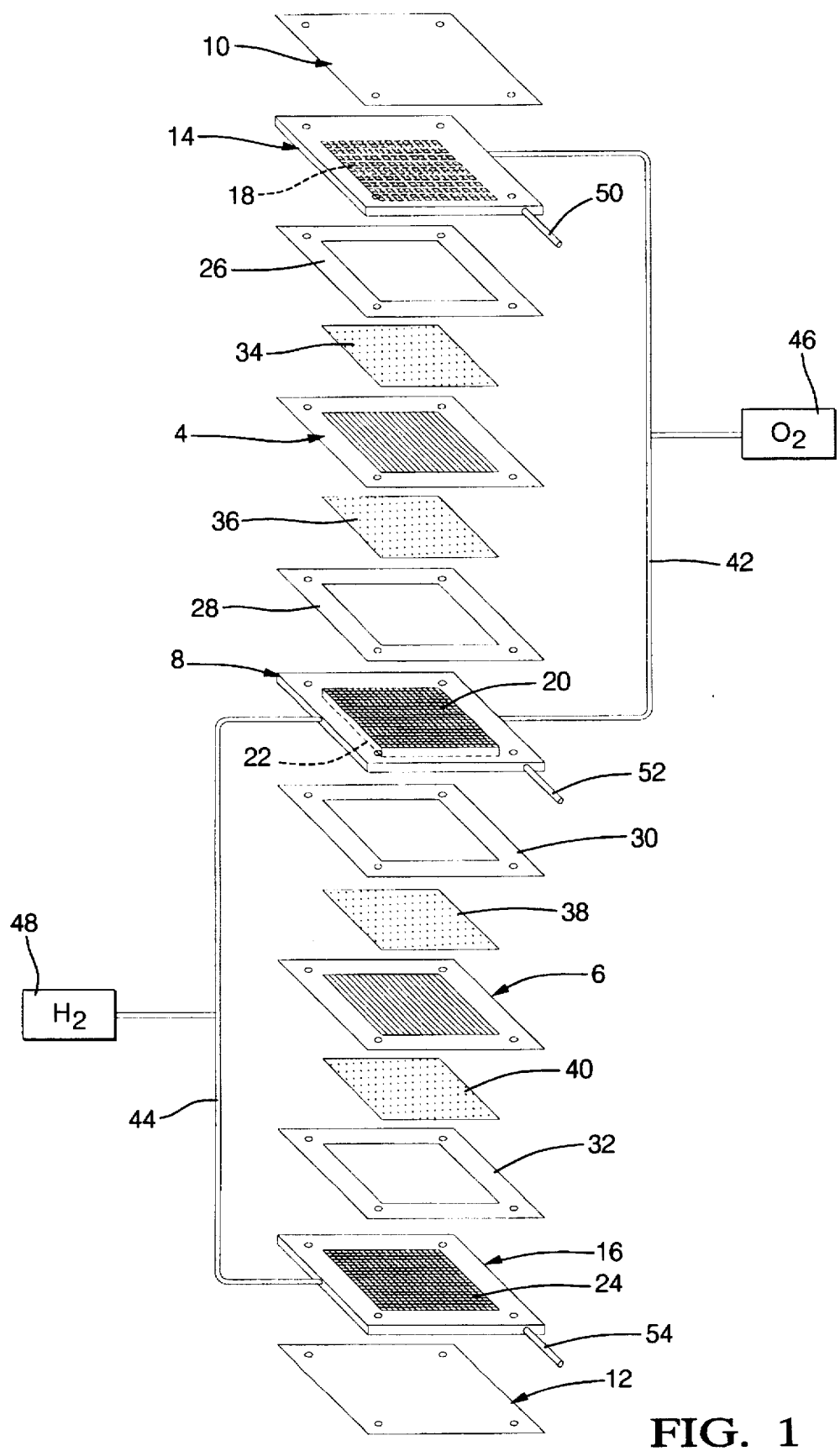
FIG. 1 is a schematic, isometric, exploded illustration of a liquid-cooled PEM fuel cell stack.

FIG. 1 depicts a two cell, bipolar PEM fuel cell stack having a pair of membrane-electrode-assemblies (MEAs) 4 and 6 separated from each other by an electrically conductive, liquid-cooled, bipolar plate 8. The MEAs 4 and 6, and bipolar plate 8, are stacked together between stainless steel clamping plates 10 and 12, and end contact elements 14 and 16. The end contact elements 14 and 16, as well as the bipolar plate 8, contain a plurality of grooves and openings 18, 20, 22, and 24 for distributing fuel and oxidant gases (i.e., $H_2$ & $O_2$) to the MEAs 4 and 6. Nonconductive gaskets 26, 28, 30, and 32 provide seals and electrical insulation between the several components of the fuel cell stack. Gas permeable carbon/graphite diffusion papers 34, 36, 38 and 40 press up against the electrode faces of the MEAs 4 and 6. The end contact elements 14 and 16 press up against the carbon/graphite papers 34 and 40 respectively, while the bipolar plate 8 presses up against the carbon/graphite paper 36 on the anode face of MEA 4, and against carbon/graphite paper 38 on the cathode face of MEA 6. Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, air may be supplied to the cathode side from the ambient and hydrogen to the anode from a methanol reformer or the like. Exhaust plumbing (not shown) for both the $H_2$ and $O_2$/air sides of the MEAs will also be provided. Additional plumbing 50, 52 and 54 is provided for supplying liquid coolant to the bipolar plate 8 and end plates 14 and 16. Appropriate plumbing for exhausting coolant from the plate 8 and end plates 14 and 16 is also provided, but not shown.

Figure 2:
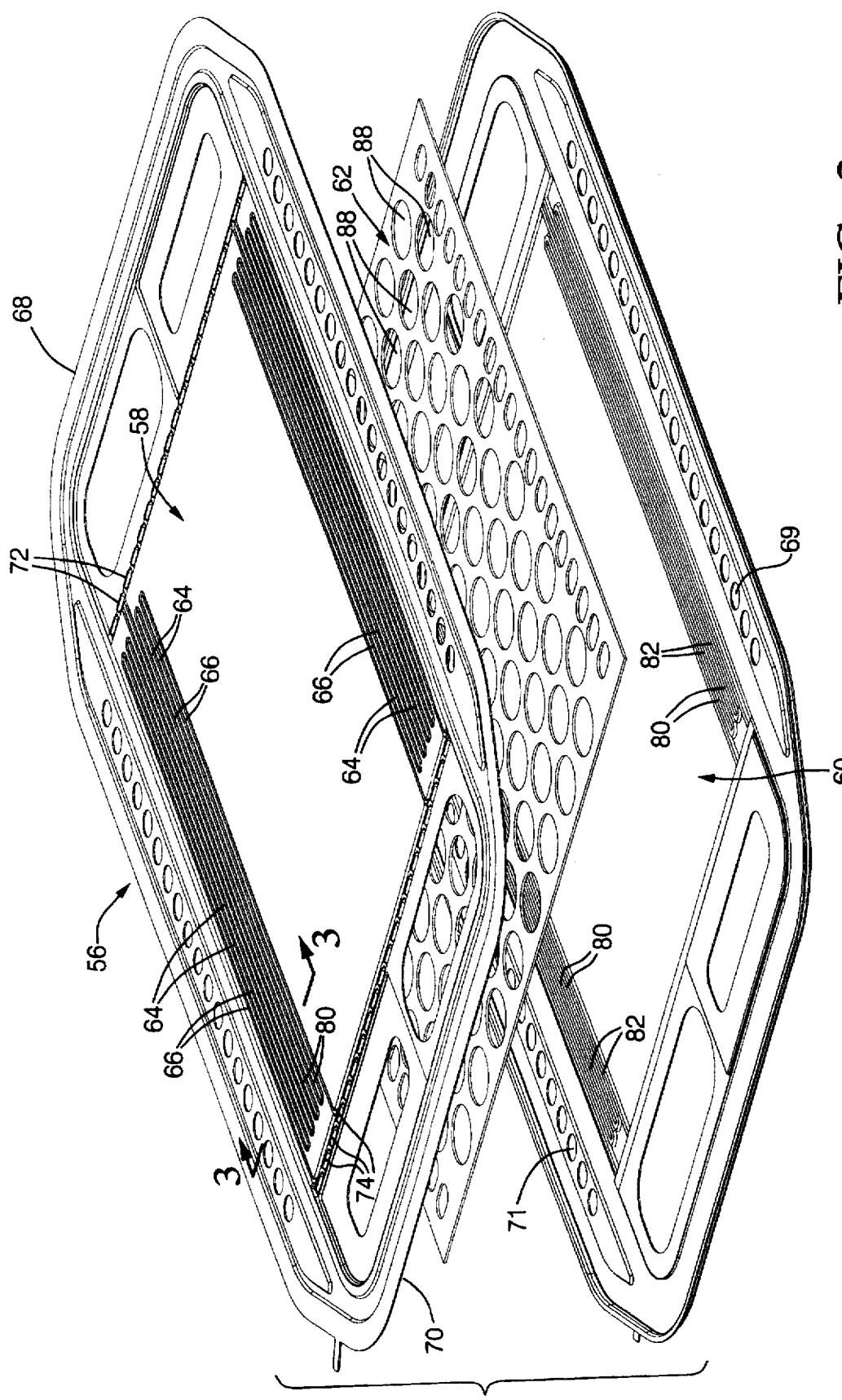
FIG. 2 is an isometric, exploded view of a bipolar plate useful with PEM fuel cell stacks like that illustrated in FIG. 1.

FIG. 2 is an isometric, exploded view of a bipolar plate 56 comprising a first exterior metal sheet 58, a second exterior metal sheet 60, and an interior spacer metal sheet 62 interjacent the first metal sheet 58 and the second metal sheet 60. The exterior metal sheets 58 and 60 are made as thin as possible (e.g., about 0.002–0.02 inches thick), may be formed by stamping, by photo etching (i.e., through a photolithographic mask) or any other conventional process for shaping sheet metal. The external sheet 58 is formed so as to provide a plurality of lands 64 which define therebetween a plurality of grooves 66 through which the fuel cell's reactant gases (i.e., $H_2$ or $O_2$) flow in a tortuous path from one side 68 of the bipolar plate to the other side 70 thereof. When the fuel cell is fully assembled, the lands 64 press against the carbon/graphite papers 36 or 38 (see FIG. 1) which, in turn, press against the MEAs 4 and 6 respectively. For drafting simplicity, FIG. 2 depicts only two arrays of lands and grooves. In reality, the lands and grooves will cover the entire external faces of the metal sheets 58 and 60 that engage the carbon/graphite papers 36 and 38. The reactant gas is supplied to grooves 66 from a header or manifold groove 72 that lies along one side 68 of the fuel cell, and exits the grooves 66 via another header/manifold groove 74 that lies adjacent the opposite side 70 of the fuel cell. As best shown in FIG. 3, the underside of the sheet 58 includes a plurality of ridges 76 which define therebetween a plurality of channels 78 through which coolant passes during the operation of the fuel cell. As shown in FIG. 3, a coolant channel 78 underlies each land 64 while a reactant gas groove 66 underlies each ridge 76.

Metal sheet 60 is similar to sheet 58. The internal (i.e., coolant side) of sheet 60 is shown in FIG. 2. In this regard, there is depicted a plurality of ridges 80 defining therebetween a plurality of channels 82 through which coolant flows from one side 69 of the bipolar plate to the other 71. Like sheet 58 and as best shown in FIG. 3, the external side of the sheet 60 will have a plurality of lands 84 thereon defining a plurality of grooves 86 through which the reactant gases pass. An interior metal spacer sheet 62 is positioned interjacent the exterior sheets 58 and 60 and includes a plurality of apertures 88 therein to permit coolant to flow between the channels 82 in sheet 60 and the channels 78 in the sheet 58 thereby breaking laminar boundary layers and affording turbulence, and hence more effective heat exchange with the inside faces 90 and 92 of the exterior sheets 58 and 60 respectively.

FIG. 4 is a magnified view of a portion of FIG. 3 and shows the ridges 76 on the first sheet 58, and the ridges 80 on the second sheet 60 brazed to the spacer sheet 62 by brazements 85, which will be discussed in more detail hereinafter in connection with the process used to make the bipolar plate 56. In the embodiments shown in FIGS. 2–4, the exterior sheets 58 and 60 and spacer sheet 62 are made entirely of a corrosion-resistant metal (e.g., titanium) which forms an oxide film/barrier layer on the surface thereof and thereby protects the underlying metal from corrosion.

FIG. 5 depicts an alternative embodiment of the present invention. More specifically, FIG. 5 depicts a first metal sheet 89 brazed directly (i.e., without an intermediate spacer sheet) to a second metal sheet 87 via a plurality of brazements 90. The sheets 89 and 87 are themselves composites which comprise a substrate metal 91 and 92 having an outer layer (e.g., a cladding or coating) 94 and 96 respectively thereon. The substrate metal 91, 92 may be a corrosion-susceptible metal such as aluminum, while the outer coating/cladding 94, 96 will comprise a conductive, corrosion-resistant material (e.g., titanium, stainless steel, chromium, titanium nitride, carbon etc.). In this embodiment, the clad/coated metal sheets 89 and 87 are corrugated, as by stamping, so as to provide lands 98 and 100, which define a plurality of grooves 102 and 104 for distributing the reactant gases across the faces of the MEAs. Corrugating also provides a plurality of ridges 103 and 105 which, in turn, define a plurality of channels 106 and 108 through which coolant flows.

FIG. 6 is still another embodiment of the present invention. FIG. 6 depicts a first corrosion-resistant exterior metal sheet 110 having a plurality of lands 112 thereon defining a plurality of grooves 114 thereon through which a reactant gas is distributed across the face of the MEA associated therewith. Similarly, a second corrosion-resistant metal sheet 116 has a plurality of lands 118 defining a plurality of grooves 120 for distributing reactant gas across the MEA associated therewith. The first and second sheets 110 and 116 are separated from each other by a corrugated perforated metal separator sheet 122 which is substantially insoluble in the coolant which is brazed to the first and second sheets 110 and 116 at the several brazements 124 to be described in more detail hereinafter.

In accordance with the present invention, the several sheets are brazed together at a plurality of oxide-free sites via a substantially insoluble brazement. That is to say, all oxides are removed from the surfaces of the sheets at the sites were brazing is to occur in order to create as low resistance electrical connection as is possible between the sheets and the brazement. The brazement like the sheets themselves are substantially insoluble in the coolant in that it will not dissolve and contribute metallic ions to the coolant which causes the otherwise substantially dielectric coolant to become inordinately conductive. When the coolant becomes conductive, stray currents flow through out the stack via the coolant and short circuiting, galvanic corrosion and coolant electrolysis can occur. Brazement metals are considered to be substantially insoluble if their solubility in the coolant over time does not cause the coolant's resistivity to drop below about 200,000 ohm-cm. Hence when water is used as the coolant metals such as copper, aluminum, tin, zinc and lead are to be avoided while metals such as chromium, nickel, silver, gold, platinum, titanium, inter alia, are acceptable as constituents of the brazement. To illustrate the significance of keeping the resistivity of the coolant high, Table I shows the calculated power losses and extent of electrolysis that can occur in a fuel cell stack having 236 cells, and operating at the open circuit and closed circuit voltages using waters having different resistivities as a coolant. Reducing the resistivity of the water to less than 200,000 ohm-cm increases the power losses, and electrolysis to unacceptable levels.

To effect brazing in accordance with a preferred embodiment of the present invention, the sheets cleaned to remove all surface oxides from the sites where brazing is to occur, and a paste or ink of the brazing material applied to the sites. To insure that an oxide-free interface between the sheets and the brazement is formed, the paste will preferably contain a flux which during the brazing operation reacts with any residual oxide that might be on the surfaces following cleaning. The brazing material may be brushed, dabbed or rolled onto the sheets, but confined to sites where brazing is to occur. Preferably a mask is first applied to the sheets with openings therein at the sites where brazing is to occur. The brazing material is then applied through the openings in the mask. It is not necessary to cover the entire area of the site, as upon heating the material will flow to and wet adjacent areas. After the paste has been applied, the sheets are aligned with each other and clamped together. Preferably, the sheets are encased in an enclosure or container to prevent contamination of the assembled sheets and then placed in a belt-type brazing furnace. Clamping will preferably be effected by simply applying a weight to the assembled sheets while they are in the oven. The thusly contained and clamped sheets are placed in a brazing furnace in an oxygen-free, moisture-free argon atmosphere, and heated up to a brazing temperature suitable to the composition of the particular brazing material being used. The assembly is held at that brazing temperature for a sufficient length of time for the brazing material to melt and to wet and diffuse into the adjacent sheets. A convenient way to test the atmosphere in the oven to insure it is oxygen-free is to pass strips of polished and acid-cleaned titanium test strips therethrough. When the titanium strips pass through the furnace without discoloration, the furnace is considered to be sufficiently oxygen-free for carrying out the brazing operation. Other brazing techniques known to those skilled in the art may also be used with the present invention provided that an oxygen-free environment is present. Hence, such techniques as torch brazing, induction brazing, dip brazing, resistance brazing etc. may also be used. Similarly, other forms of brazing materials such as adhesive foils applied to the junction sites may also be used.

In accordance with a preferred embodiment of the present invention, the exterior and separator sheets comprise Grade 2 titanium, and the brazing material is an alloy comprising about 25% by weight chromium, about 10% by weight phosphorous and the balance nickel, which material is commercially available under the trade name NICROBRAZE™ 51 sold by the Wall Colmanoy corporation. NICROBRAZE™ 51 is particularly advantageous because it is also substantially free of trace elements which could form brittle intermetallic compounds, which weaken the joint and increase in the internal resistant thereof. The sheets have a gross dimension (i.e length X width) of 11 in by 16 in and are clamped together with 60 pounds of weights applied thereto, prior to clamping, the sheets are cleaned by (1) degreasing with methyl-ethyl-ketone, and (2) picketing for 2–5 minutes in a solution comprising (a) 40% nitric acid, (b) 2%–5% hydrofluoric acid, (c) 4 grams/gallon of ammonium biflouride, and water, the assembly is placed in a belt-type furnace heated to a temperature of 1850° F. in an oxygen-free, moisture-free argon atmosphere. The sheets are held at this temperature for about 15 minutes before allowing the assembly to cool. Best results (i.e., lowest internal resistance) are obtained by allowing the plate to cool in the argon to 1000°, and then replacing the argon with nitrogen. The plate is held for 35 minutes in the nitrogen before cooling to ambient temperature. The nickel-chromium brazing alloy diffuses into the titanium, and some alloying of the brazements with the titanium occurs at the interface between the Ti and the brazement. Care must be taken to control the temperature and time in the brazing oven to prevent the brazement from dissolving the titanium to the point where it eats a hole through the sheet. Other nickel-chromium-phosphorous brazes such as NICROBRAZE™ 50 (i.e., 14% chromium, 10% phosphorous and the balance nickel) have also been used effectively. Other substantially insoluble braze materials such as gold, silver, platinum, etc., are also seen to be effective for this purpose.

Electrical resistance measurements were conducted on a number of brazed samples. A pair of 0.02 inch thick Grade 2 titanium coupons each having an interfacial surface of 8.3 cm$^2$ were brazed as described above with three different braze materials, i.e., NICROBRAZE™ 10, NICROBRAZE™ 50, and NICROBRAZE™ 51 cooled in a nitrogen atmosphere. The samples were tested under different conditions as follows:

1. Placed between a pair of gold-plated copper plates applied with forces of 1000 lbs. and 2000 lbs., and
2. Placed between porous graphite layers (0.008 in. thick) and compressed between a pair of gold-plated copper plates with applied forces of 1000 lbs. and 2000 lbs.

Table II shows the results of the aforesaid resistance tests and shows the current applied to each set of test coupons, the voltage drop measured and the resistance calculated therefrom. These data show that coupons brazed with NICROBRAZE™ 51 and cooled in nitrogen had significantly less resistance than samples made from either NICROBRAZE™ 50 or NICROBRAZE™ 10.

While the invention has been described in terms of certain specific embodiments thereof it is not intended to be limited thereto but rather only to the extent set forth hereafter in the claims which follow.

TABLE I

|   | Number of Cells | Fluid Resist Ohm-cm | Cell Voltg V | Hydrogen Evolution Liter/hr | Total Pwr Loss Watts |
|---|---|---|---|---|---|
| a) | 236 | 200,000 | .60 | 2.04 | 236.05 |
| b) | 236 | 1,000,000 | .60 | .41 | 47.21 |
| c) | 236 | 14,000,000 | .60 | .03 | 3.37 |
| d) | 236 | 200,000 | .95 | 3.25 | 591.74 |
| e) | 236 | 1,000,000 | .95 | .65 | 118.36 |
| f) | 236 | 14,000,000 | .95 | .05 | 8.45 |

TABLE II

Brazed Coupon Voltage Drop (Resistance)

| Braze Material | Between Gold Plated Copper | Applied Force (lbs) | Applied Current (A) | Voltage Drop (mV) | Resistance (mOhm-cm$^2$) |
|---|---|---|---|---|---|
| N10 | Yes | 1000 | 8.3 | 11.4 | 11.4 |
| N10 | Yes | 1000 | 16.6 | 23.1 | 11.6 |
| N10 | Yes | 2000 | 8.3 | 2.4 | 2.4 |
| N10 | Yes | 2000 | 16.6 | 4.9 | 2.5 |
| N10 | Y w/graphite | 1000 | 8.3 | 20.5 | 20.5 |
| N10 | Y w/graphite | 1000 | 16.6 | 41.6 | 20.8 |
| N10 | Y w/graphite | 2000 | 8.3 | 7.1 | 7.1 |
| N10 | Y w/graphite | 2000 | 16.6 | 14.3 | 7.2 |
| N50 | Yes | 1000 | 8.3 | 16.3 | 16.3 |
| N50 | Yes | 1000 | 16.6 | 32.5 | 16.3 |
| N50 | Yes | 2000 | 8.3 | 6.4 | 6.4 |
| N50 | Yes | 2000 | 16.6 | 13.0 | 6.5 |
| N50 | Y w/graphite | 1000 | 8.3 | 20.9 | 20.9 |
| N50 | Y w/graphite | 1000 | 16.6 | 42.0 | 21.0 |
| N50 | Y w/graphite | 2000 | 8.3 | 9.5 | 9.5 |
| N50 | Y w/graphite | 2000 | 16.6 | 19.5 | 9.8 |
| N51 w/nitrogen | Yes | 1000 | 8.3 | 2.8 | 2.8 |
| N51 w/nitrogen | Yes | 1000 | 16.6 | 5.6 | 2.8 |
| N51 w/nitrogen | Yes | 2000 | 8.3 | 1.3 | 1.3 |
| N51 w/nitrogen | Yes | 2000 | 16.6 | 2.6 | 1.3 |
| N51 w/nitrogen | Y w/graphite | 1000 | 8.3 | 3.2 | 3.2 |
| N51 w/nitrogen | Y w/graphite | 1000 | 16.6 | 4.2 | 2.1 |
| N51 w/nitrogen | Y w/graphite | 2000 | 8.3 | 1.0 | 1.0 |
| N51 w/nitrogen | Y w/graphite | 2000 | 16.6 | 2.0 | 1.0 |

I claim:

1. A liquid-cooled, bipolar plate for separating adjacent first and second cells of a PEM fuel cell and for conducting electric current between said cells, said plate comprising: (1) a first corrosion-resistant metal sheet having an anode-confronting face comprising a plurality of first lands defining a plurality of first grooves for distributing hydrogen to said first cell, and a first heat exchange face; (2) a second corrosion-resistant metal sheet having a cathode-confronting face comprising a plurality of second lands defining a plurality of second grooves for distributing oxygen to said second cell, and a second heat exchange face; and (3) said first and second heat exchange faces (a) confronting each other so as to define therebetween a coolant flow passage adapted to receive a substantially dielectric liquid coolant, and (b) being electrically coupled to each other at a plurality of oxide-free sites via a brazement having a melting temperature less than the melting temperature of said sheets, said brazement being selected from metals which are so insoluble in said coolant as not to contaminate said coolant with metal ions which diminish the dielectric character of said coolant.

2. A plate according to claim 1 wherein said first and second sheets are metallurgically bonded directly to each other by said brazement.

3. A plate according to claim 1 wherein said first and second metal sheets are separated from each other by a separator metal sheet which is metallurgically bonded to said first and second sheets by said brazement.

4. A plate according to claim 3 wherein said separator sheet partitions said coolant flow passage into a plurality of flow channels.

5. A plate according to claim 4 wherein said separator sheet is perforated to permit said coolant to move back and forth between flow channels on opposite sides of said separator sheet.

6. A liquid-cooled, bipolar plate for separating adjacent first and second cells of a PEM fuel cell and for conducting electric current between said cells, said plate comprising: (1) a first corrosion-resistant metal sheet having a hydrogen-confronting face comprising a plurality of first lands defining a plurality of first grooves for distributing hydrogen to said first cell, and a first heat exchange face comprising a plurality of ridges defining a plurality of first channels for flowing a substantially dielectric liquid coolant across said first heat exchange face; (2) a second corrosion-resistant metal sheet having an oxygen-confronting face comprising a plurality of second lands defining a plurality of second grooves for distributing oxygen to said second cell, and a second heat exchange face comprising a plurality of second ridges defining a plurality of second channels for flowing said coolant across said second heat exchange face; and (3) said first and second heat exchange faces confronting each other and being electrically coupled to each other at a plurality of oxide-free sites on said ridges via a brazement having a melting temperature less than the melting temperature of said sheets, said brazement being selected from metals which are so insoluble in said coolant as not to contaminate said coolant with metal ions which diminish the dielectric character of said coolant.

7. A plate according to claim 6 wherein said ridges of said first and second sheets are metallurgically bonded directly to each other by said brazement.

8. A plate according to claim 6 wherein said first and second metal sheets are separated from each other by a separator metal sheet which is metallurgically bonded to said first and second sheets by said brazement.

9. A plate according to claim 1 wherein said brazement comprises an alloy of nickel.

10. A plate according to claim 9 wherein said brazement comprises a nickel-chromium alloy.

11. A plate according to claim 10 wherein said first and second sheets comprise titanium.

12. A plate according to claim 8 wherein said first, second and separator sheets comprise titanium.

* * * * *